United States Patent [19]

Fox

[11] Patent Number: 5,017,857
[45] Date of Patent: May 21, 1991

[54] CIRCUIT AND METHOD FOR VOLTAGE REGULATION OF ELECTRIC POWER SOURCES

[75] Inventor: David A. Fox, Shawnee Township, Allen County, Ohio

[73] Assignee: Westinghouse Electric Corp., Pittsburgh, Pa.

[21] Appl. No.: 582,826

[22] Filed: Sep. 17, 1990

Related U.S. Application Data

[63] Continuation of Ser. No. 290,388, Dec. 29, 1988, abandoned.

[51] Int. Cl.$^5$ .............................................. H02P 9/00
[52] U.S. Cl. ...................................... 322/25; 322/27
[58] Field of Search ...................... 322/22, 23, 24, 25, 322/27, 28, 59

[56] References Cited

U.S. PATENT DOCUMENTS

| | | | |
|---|---|---|---|
| 3,621,370 | 11/1971 | Vandervort | 322/27 X |
| 3,854,082 | 12/1974 | Nasby et al. | 320/24 X |
| 4,044,296 | 8/1977 | Dhyanchand et al. | 322/25 |
| 4,262,242 | 4/1981 | Glennon | 322/59 X |
| 4,335,344 | 6/1982 | Gant | 322/25 |
| 4,410,848 | 10/1983 | Frierdich | 322/27 X |
| 4,442,396 | 4/1984 | Hucker | 322/25 X |
| 4,446,417 | 5/1984 | Fox et al. | 322/25 |
| 4,477,765 | 10/1984 | Glennon et al. | 322/25 X |
| 4,839,575 | 6/1989 | MacFarlane | 322/25 |

FOREIGN PATENT DOCUMENTS

| | | | |
|---|---|---|---|
| 0055799 | 4/1982 | Japan | 322/25 |
| 0024919 | 2/1983 | Japan | 322/25 |

*Primary Examiner*—Steven L. Stephan
*Assistant Examiner*—Kristine Peckman
*Attorney, Agent, or Firm*—R. P. Lenart

[57] ABSTRACT

A method of regulating the output voltage of an electric power source combines a status signal representative of the output voltage of the power source with a reference signal to produce a first control signal. A status signal representative of the output current of the power source is combined with the reference signal to produce a second control signal. A bias voltage signal is applied to a junction point and the first and second control signals are connected through an OR network to the junction point, thereby forming an output signal at the junction point. The power source output is then controlled in response to this output signal. Under normal operating conditions, the magnitude of the control signal corresponding to the power source output voltage is less than the magnitude of the bias voltage signal, and the magnitude of the control signal representative of current is greater than the magnitude of the bias voltage signal, such that the voltage sensing loop is in control of the power source output.

6 Claims, 3 Drawing Sheets

CIRCUIT AND METHOD FOR VOLTAGE REGULATION OF ELECTRIC POWER SOURCES

This application is a continuation of application Ser. No. 290,388 filed Dec. 29, 1988, now abandoned.

BACKGROUND OF THE INVENTION

This invention relates to circuits and methods for voltage regulation and, more particularly, to such circuits and methods as applied to regulation of the output voltage of electric power sources.

Typical electric generator voltage regulators include a sensing circuit which senses a high power AC or DC output voltage of the generator and produces a DC output signal proportional to the sensed voltage. The sensing circuit output signal is subtracted from a reference signal to develop an error signal proportional to the difference between the actual generator output and a desired generator output. A compensator modifies the loop gain of the voltage regulator feedback control loop to achieve the desired transient response.

The output of the compensator is amplified to produce exciter field current for the generator. The output of the generator is proportional to the exciter field current. Because of the power levels required, switching amplifiers are typically used to produce the exciter field current. These amplifiers require a pulse width modulated input, which is produced by amplifying the error signal.

The pulse width modulated output required from the error amplifier imposes limitations on the sensing circuit. Since the gain of the error amplifier is determined by the ripple in the output of the sensing circuit, this ripple must be controlled to maintain constant gain of the system.

The limitation on the sensing circuit can be avoided if the regulator power amplifier can operate with a linear error signal, such that pulse width modulated error signals are not required. The present invention provides a circuit and method for sensing and control of generator output voltage which optimizes the system performance while utilizing linear error output signals to control the generator excitation.

SUMMARY OF THE INVENTION

This invention provides a method of regulating the output voltage of an electric power source in which a first status signal, representative of the output voltage of the power source, is produced and combined with a reference signal to produce a first control signal. Similarly, a second status signal, representative of the output current of the power source, is produced and combined with a reference signal to produce a second control signal. A bias voltage signal is supplied to a junction point and the first and second control signals are coupled to that point through an OR network, thereby forming an output signal at the junction point. The power source output voltage is then controlled in response to the output signal. The magnitude of the first control signal is greater than the magnitude of the bias voltage signal when the output voltage of the power source is below a preselected magnitude, and the magnitude of the second control signal is greater than the magnitude of the bias voltage signal when the output current of the power source is less than a predetermined magnitude.

When the method of this invention is applied to a DC link, variable speed constant frequency generating system, an additional status signal, representative of the DC voltage of the DC link conductors, is produced and combined with the reference signal to produce a third control signal. This third control signal is also coupled to the junction point through the OR network. The magnitude of the third control signal is greater than the magnitude of the bias voltage signal when the magnitude of the sensed DC voltage is less than a second preselected magnitude.

When this invention is used with generators having multiple phase outputs, an additional status signal may be produced which is representative of the magnitude of the highest voltage output phase of the generator. This additional status signal is combined with the output current status signal to produce the second control signal.

This invention also encompasses circuits which perform the above method. These circuits produce a linear output and employ independent error detectors and compensation for power source output voltage and load current control.

Circuits performing the method of this invention may include a soft start feature wherein the reference signal is a DC voltage signal which is gradually increased to its normal operating level when the circuits are turned on.

BRIEF DESCRIPTION OF THE DRAWINGS

The invention will become more readily apparent from the following description of the preferred embodiment thereof, shown by way of example only, in the accompanying drawings wherein.

DESCRIPTION OF THE PREFERRED EMBODIMENT

Figure 1:
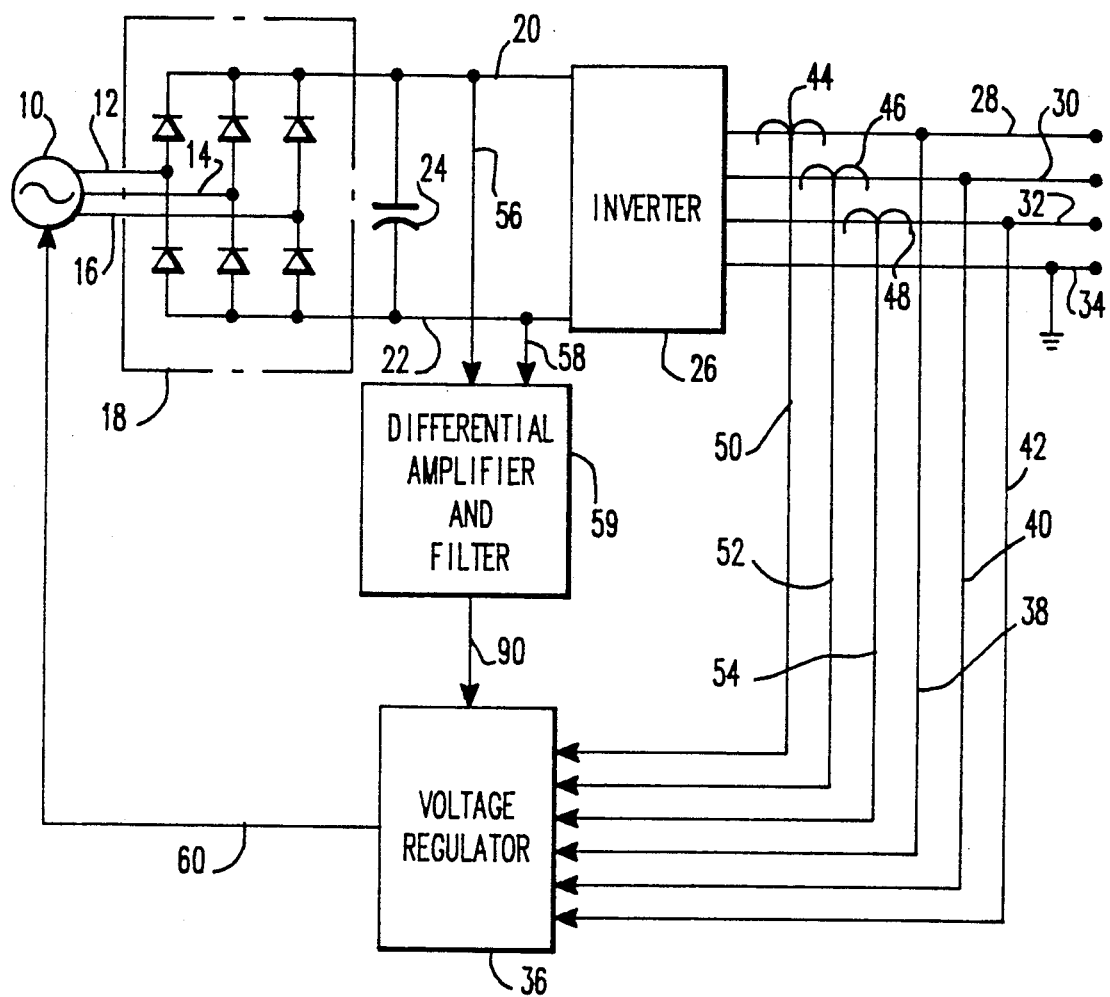
FIG. 1 is a block diagram of an electric power generating system including a voltage regulator which performs the method of the present invention.

Referring to the drawings, FIG. 1 is a block diagram of an electric power generating system including a voltage regulator which performs the method of the present invention. The system includes a generator 10 which is coupled to be driven at varying speeds by an external prime mover, not shown, and provides a three-phase output on lines 12, 14 and 16. This three-phase output is rectified by bridge rectifier 18 and fed to a pair of DC link conductors 20 and 22. A filter capacitor 24 is connected between the DC link conductors. An inverter 26 receives the DC voltage from the DC link conductors and produces a constant frequency, multiple phase output on lines 28, 30, 32 and 34. The voltage regulator 36 of this invention monitors the output voltage of the inverter via lines 38, 40 and 42. The output current of the inverter is sensed by current transformers 44, 46 and 48 to produce current signals on lines 50, 52 and 54. The regulator also monitors the DC link voltage via lines 56 and 58 through a signal conditioning circuit 59, which includes a differential amplifier and filter. All of these inputs are used by the voltage regulator to control the exciter field current of the generator 10 by way of line 60.

Figure 2A:
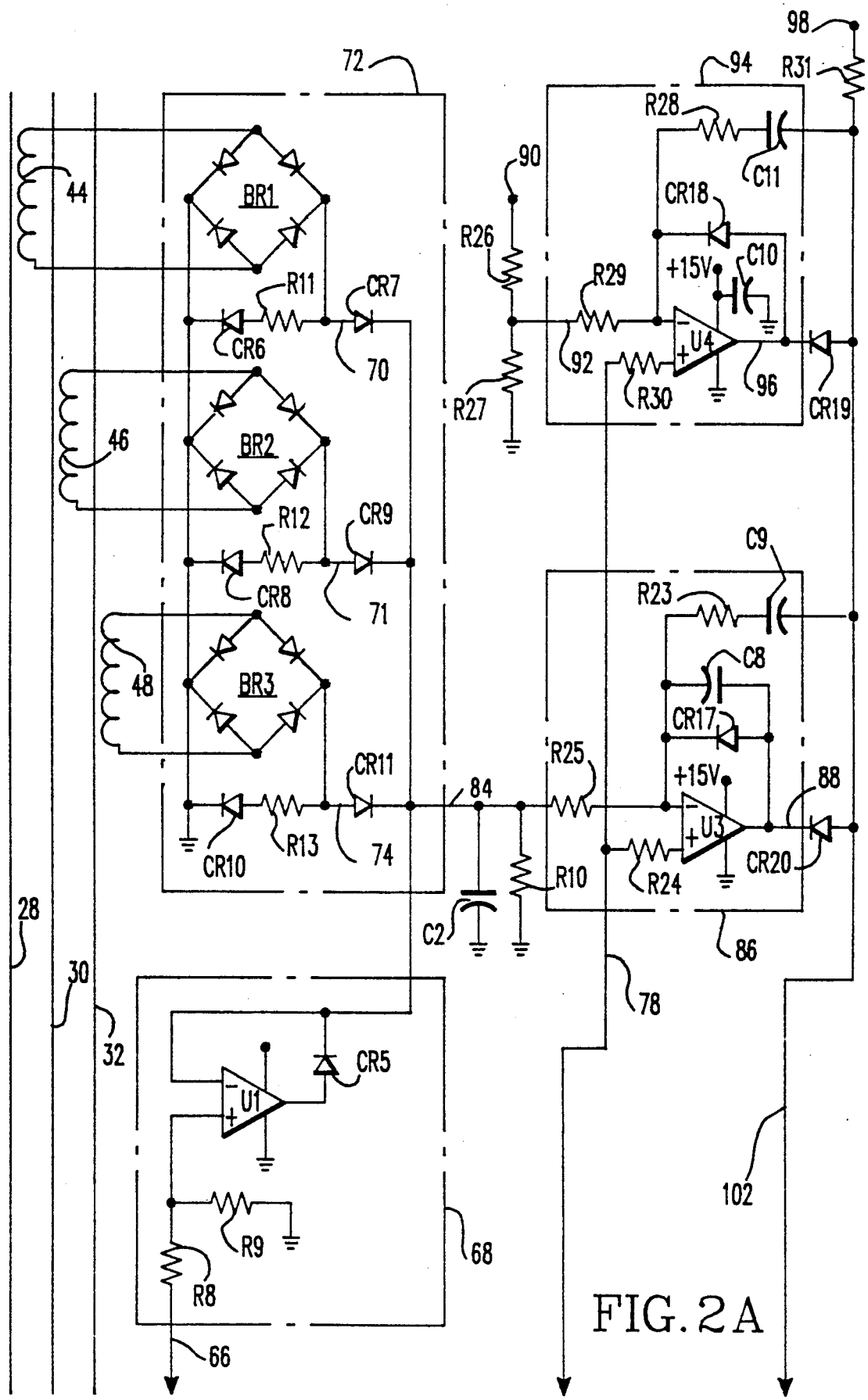
FIGS. 2A and 2B show a schematic diagram of the voltage regulator of FIG. 1.
Figure 2B:
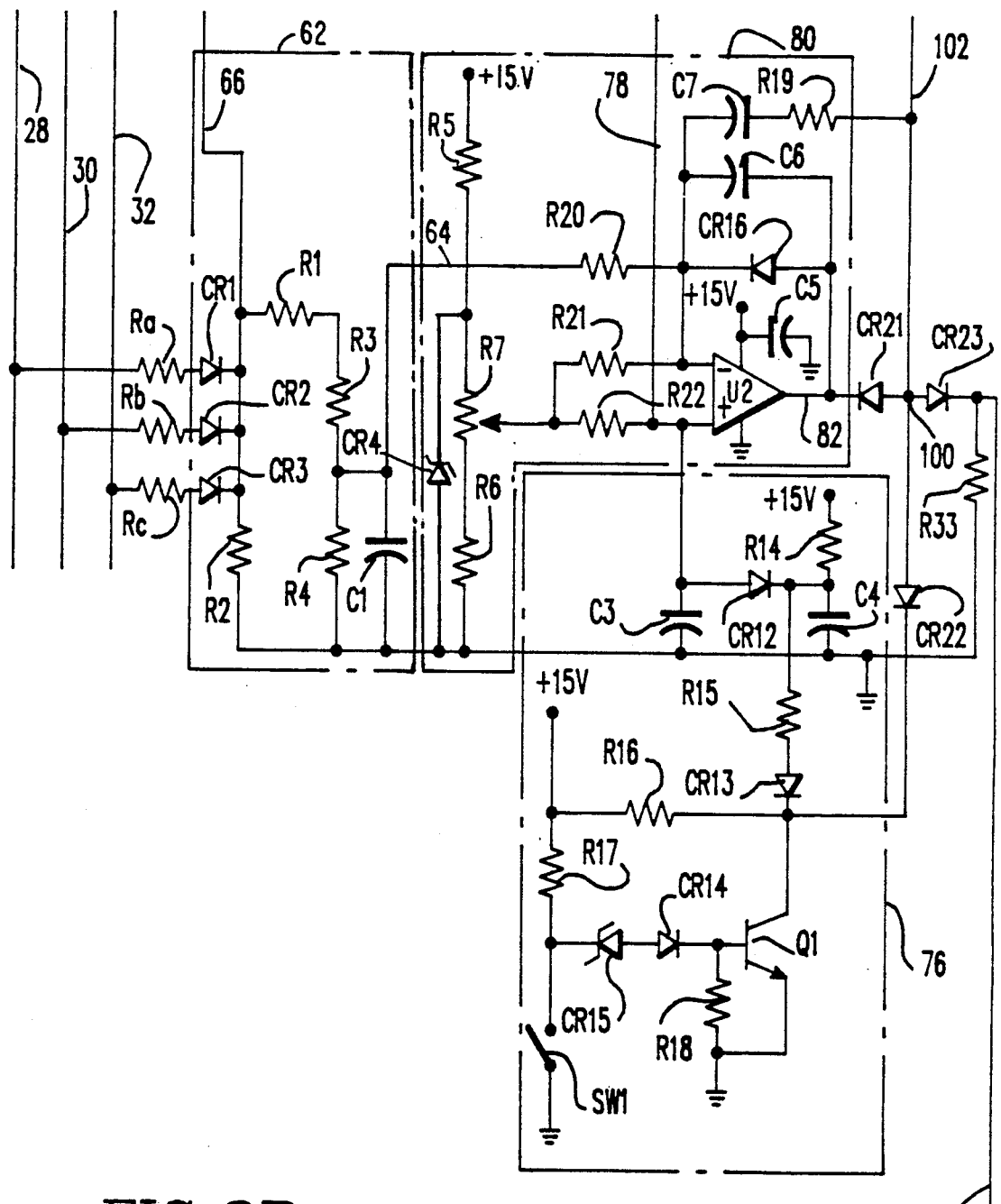

FIGS. 2A and 2B show a schematic diagram of the voltage regulator of FIG. 1. The voltage regulator includes a voltage monitoring circuit 62, which is connected to phase conductors 28, 30 and 32 via resistors $R_a$, $R_b$ and $R_c$, and which comprises diodes CR1, CR2, and CR3; resistors R1, R2, R3, and R4; and capacitor C1. These components combine to produce a first status signal on line 64, which is representative of the average output voltage of the inverter appearing on lines 28, 30 and 32. Line 66 is connected to a high phase sensing circuit 68. The high phase sensing circuit comprises diode CR5; amplifier U1; and resistors R8 and R9. These components combine to produce a status signal at the output of amplifier U1, which is proportional to the magnitude of the highest voltage appearing on the output phase conductors of the inverter. A current sensing circuit 72, which comprises bridge rectifiers BR1, BR2 and BR3; diodes CR6, CR7, CR8, CR9, CR10 and CR11; and resistors R11, R12 and R13, senses the generator output current via current transformers 44, 46 and 48 and produces a status signal output which is representative of the output current of the inverter. The combination of circuits 68 and 72, capacitor C2 and resistor R10 forms a peak sensitive circuit which produces a combined status signal on line 84. The combined status signal magnitude is determined by the largest of the phase current indicating signals on lines 70, 71 and 74, and the high phase status signal at the output of U1.

A soft start reference circuit 76 provides controlled turn on of the system. That circuit includes transistor Q1; diodes CR12, CR13, CR14 and CR15; capacitors C3 and C4; and resistors R14, R15, R16, R17 and R18. When switch SW1 is closed, these components operate to produce a DC reference voltage signal on line 78.

An amplifying and compensating circuit 80, comprising amplifier U2; diodes CR4 and CR16; capacitors C5, C6 and C7; and resistors R5, R6, R7, R19, R20, R21 and R22, serves to combine the reference signal on line 78 and the first voltage status signal on line 64 to produce a first control signal on line 82.

The combined status signal on line 84 is fed to amplifying and compensating circuit 86. That circuit comprises amplifier U3; diode CR17; capacitors C8 and C9; and resistor R23, R24 and R25. These components act to combine the reference signal on line 78 and the combined status signal on line 84 to produce a second control signal on line 88.

Terminal 90 is connected to the output of signal conditioning circuit 59 in the system of FIG. 1 and the voltage divider formed by resistors R26 and R27 serves to produce a DC link voltage status signal, representative of the DC link voltage, on line 92. A third amplifying and compensating circuit 94, which comprises amplifier U4; diode CR18; capacitors C10 and C11; and resistors R28, R29 and R30, receives the DC link voltage status signal and the reference signal and combines and amplifies those signals to produce a third control signal on line 96.

By applying a DC voltage to terminal 98, a DC bias voltage is produced at junction point 100 via resistor R31 and line 102. Diodes CR19, CR20 and CR21 serve as an OR network to couple the control signals on lines 82, 88 and 96 to the junction point 100. This forms an output signal which is fed through diode CR23 via line 104 to a power amplifier 106. The power amplifier controls the exciter field current of the generator via line 108.

The operation of the circuit of FIGS. 2A and 2B can now be described. When switch S1 is closed, transistor Q1 clamps the reference signal on line 78 to ground through diode CR12, CR13 and resistor R15. When switch S1 opens to turn on the circuit, transistor Q1 turns off, allowing capacitor C4 to charge to 15 volts. The reference voltage one line 78 ramps up to the level established by the reference zener diode CR4 and potentiometer R7. In the preferred embodiment, the normal AC output voltage of the inverter is a three-phase, 115 volts at 400 Hertz. Sensing of the three-phase AC outputs occurs through resistors $R_a$, $R_b$ and $R_c$. Half-wave currents flow through these resistors and diodes CR1, CR2 and CR3 into resistor R2. The resulting voltage waveform across R2 has the appearance of a six-pulse, full wave rectified signal but it actually consists of the sum of three half-wave rectified input currents. Consequently, the waveform at R2 contains information about the complete positive half-cycle of each phase voltage. Responses to changes of input voltage are thus very fast. The R2 voltage is divided by resistors R1, R3 and R4 and filtered by capacitor C1 to eliminate high frequency noise. Resistor R1 has a positive temperature coefficient to compensate for the voltage across the input diodes.

The voltage across capacitor C1 is compared to the reference voltage by amplifying and compensating circuit 80. The input resistor R20 and the feedback components R19, C6, C7 and CR16, modify the gain to control the transient response of the generator-regulator system. The output of amplifier U2 is connected through diode CR21 to pull up resistor R31.

AC current is sensed by current transformers coupled to the three output phases of the generator. Each phase current signal is rectified by a diode bridge and applied to a burden resistor and diode to develop a voltage signal proportional to the AC current in that phase. The three voltage signals are connected through diode CR7, CR9 and CR11 to develop a total current signal across resistor R10. The diodes CR6, CR8 and CR10, in series with the burden resistors R11, R12 and R13, compensate for the voltage drop in diodes CR7, CR9 and CR11. Filter capacitor C2 provides a long discharge time constant so that the current sensing circuit responds to peak current. This provides nearly equal performance for single phase or three phase current limiting. The voltage on line 84 is compared to the reference voltage by amplifying and compensating circuit 86. The output of circuit 86 is connected to pull up resistor R31 through diode CR20.

For applications to DC link variable speed constant frequency systems, an input 90 is available for a buffered DC link signal. In case of a failure in the AC sensing circuit, or a short circuit on the AC voltage, the DC input can be used to limit the link voltage. The voltage developed by voltage dividing resistors R26 and R27 is compared to the reference voltage by amplifying and compensating circuit 94. The output of circuit 94 is connected to pull up resistor R31 through diode CR19.

The AC sensing voltage at resistor R2 is also connected to amplifier U1 through divider resistors R8 and R9. Amplifier U1 is connected to form a peak detector to charge capacitor C2. The voltage at C2 thus responds to the peak voltage of the highest input AC voltage. For normal operation, capacitor C2 is charged to slightly below the reference voltage.

The voltage at pull up resistor R31 is controlled by the lowest output from amplifiers U2, U3 or U4. When the control signal is off, the voltage at resistor R31 is pulled down through diode CR22 to ground by transistor Q1. Diode CR23 compensates for the voltage drop across the OR network diodes CR19, CR20 and CR21, so that the circuit output matches the output of the lowest controlling error amplifier or goes to zero when transistor Q1 is on. The output of the circuit on line 104 is used to control the exciter field current of the generator.

The feedback components of the three amplifying and compensating circuits 80, 86 and 94, are connected in slightly different fashions. The output of each of the amplifiers is clamped by a feedback diode which operates to maintain closed loop control of the amplifiers which are not controlling the generator output at the time. The feedback RC network of each amplifier is connected to the pull up resistor side of the OR diode network. This connection maintains a proper bias on the feedback capacitor to ensure rapid response of each control loop. If a feedback network of amplifier U2 were connected directly to its output, there would be a delay in response of the voltage regulator. During a short circuit, for example, the AC sensing would be zero and the output of amplifier U2 in one embodiment would be about 5.6 volts DC. This difference would appear across capacitor C7 and would delay the response of amplifier U2 when the short circuit was removed and the voltage loop should begin to operate. Capacitor C6 around amplifier U2 reduces the ripple voltage in the output control signal without affecting the response of the circuit.

The feedback circuit around amplifier U4 is the same as that around amplifier U2, but without the direct feedback capacitor. Capacitor C8 around amplifier U3 is large enough to affect the transient response of the system. It is required because the high phase sensing signal from amplifier U1 biases the input of amplifier U3 very close to the reference level. Without capacitor C8, control circuit response to load application is slowed down because the output of amplifier U3 tries to control the rate of rise of the control signal.

It should now be apparent that circuits constructed in accordance with this invention include independent sensing circuits for AC voltage and output current of the inverter. The output of each sensing circuit is compared to a reference signal by independent error amplifiers with compensation for each amplifier. The outputs of the amplifiers are connected through an OR network to a pull up resistor to produce the output of the control circuit. This output is amplified in a power amplifier to provide exciter field current for the generator.

The diode OR connection provides logic to determine which circuit is controlling the generator exciter field current. Normally, the AC voltage sensing and error amplifier is in control. The current and DC inputs are below the reference levels and the outputs of their amplifiers are high. If the load current exceeds the desired level, the output of the error amplifier U3 goes low to control the input of the power stage and thus the exciter field current of the generator. The same action occurs at amplifier U4 if the DC link voltage exceeds the set limit. The use of independent error amplifiers and compensation allows optimization of response for normal AC regulation, current limiting and DC link voltage limiting.

The AC voltage sensing circuit 62 responds to the average of the three input phase voltages. The high phase sensing circuit 68 develops an output proportional to the magnitude of the highest phase voltage. This is important in unbalanced load or overload conditions where the highest phase voltage may exceed specifications even though the average voltage is still being regulated within normal limits. The output of the high phase sensing circuit is combined with the output of the current sensing circuit with the combined signal sharing the same error amplifier.

Voltage regulation in accordance with this invention provides sensing and control by way of a linear output signal. Independent error detectors and compensation for AC, load current and DC link controls may be provided. The large gain of the error amplifiers provides regulation limited only by sensing and reference accuracy. Fast response AC sensing and high phase suppression are included.

Although the present invention has been described in terms of what is at present believed to be its preferred embodiment, it will be apparent to those skilled in the art that various changes may be made without departing from the scope of the invention. For example, although the invention is shown as being applied to a power source having a multiple phase AC generator and an inverter, it is also compatible with other types of power sources. The preferred embodiment of this invention can be readily adapted for use with multiple phase AC, single phase AC and DC generators, either alone or in combination with an inverter. It is therefore intended that the appended claims cover such systems.

What is claimed is:

1. A method of regulating output voltage of an electric power source, said method comprising the steps of:
    producing a first status signal representative of the output voltage of an electric power source;
    combining said first status signal with a reference signal to produce a first control signal;
    producing a second status signal representative of the output current of said power source;
    combining said second status signal with said reference signal to produce a second control signal;
    supplying a bias voltage signal to a junction point;
    coupling said first and second control signals to said junction point through first and second diodes, thereby forming a linear output signal at said junction point;
    controlling the output voltage of said power source in response to said output signal;
    wherein the magnitude of said first control signal is greater than the magnitude of said bias voltage signal when the output voltage of said power source is less than a preselected magnitude; and
    wherein the magnitude of said second control signal is greater than the magnitude of said bias voltage signal when the output current of said power source is less than a predetermined magnitude.

2. A method of regulating the output voltage of an electric power source said method comprising the steps of:
    producing a first status signal representative of the output voltage of an electric power source;
    combining said first status signal with a reference signal to produce a first control signal;
    producing a second status signal representative of the output current of said power source;
    combining said second status signal with said reference signal to produce a second control signal;
    producing a third status signal representative of a DC voltage formed by rectifying the output voltage of said power source;
    combining said third status signal with said reference signal to produce a third control signal;
    supplying a bias voltage signal to a junction point;

coupling said first, second and third control signals to said junction point through first, second and third diodes thereby forming a linear output signal at said junction point;
wherein the magnitude of said first control signal is greater than the magnitude of said bias voltage signal when the output voltage of said power source is less than a preselected magnitude;
wherein the magnitude of said second control signal is greater than the magnitude of said bias voltage signal when the output current of said power source is less than a predetermined magnitude; and
wherein the magnitude of said third control signal is greater than the magnitude of said bias voltage signal when the magnitude of said DC voltage is less than a second preselected magnitude.

3. A method of regulating output voltage of an electric power source, said method comprising the steps of:
producing a first status signal representative of the average output voltage of a multiple phase electric power source;
combining said first status signal with a reference signal to produce a first control signal;
producing a second status signal representative of the magnitude of the highest voltage on a plurality of output phases of said power source;
producing a third status signal representative of the output current of said power source;
combining said second and third status signals to obtain a fourth status signal;
combining said fourth status signal with said reference signal to produce a second control signal;
supplying a bias voltage signal to a junction point;
coupling said first and second control signals to said junction point through first and second diodes, thereby forming a linear output signal at said junction point;
controlling the output voltage of said power source in response to said output signal;
wherein the magnitude of said first control signal is greater than the magnitude of said bias voltage signal when the output voltage of said power source is less than a preselected magnitude; and
wherein the magnitude of said second control signal is greater than the magnitude of said bias voltage signal when both the output current of said power source is less than a predetermined magnitude and the magnitude of the highest voltage on said output phase of said power source is less than a second preselected magnitude.

4. A sensing and control circuit for a voltage regulator comprising:
means for producing a first status signal representative of the output voltage of an electric power source;
means for combining said first status signal with a reference signal to produce a first control signal;
means for producing a second status signal representative of the output current of said power source;
means for combining said second status signal with said reference signal to produce a second control signal;
means for supplying a bias voltage signal to a junction point;
first and second diodes for coupling said first and second control signals to said junction point, thereby forming a linear output signal at said junction point;
wherein the magnitude of said first control signal is greater than the magnitude of said bias voltage signal when the output voltage of said power source is less than a preselected magnitude; and
wherein the magnitude of said second control signal is greater than the magnitude of said bias voltage signal when the output current of said power source is less than a predetermined magnitude.

5. A sensing and control circuit for a voltage regulator comprising:
means for producing a first status signal representative of the output voltage of an electric power source;
means for combining said first status signal with a reference signal to produce a first control signal;
means for producing a second status signal representative of the output current of said electric power source;
means for combining said second status signal with said reference signal to produce a second control signal;
means for producing a third status signal representative of a DC voltage formed by rectifying said output voltage of said power source;
means for combining said third status signal with said reference signal to produce a third control signal;
means for supplying a bias voltage signal to a junction point;
first, second and third diodes for coupling said first, second and third control signals to said junction point, thereby forming a linear output signal at said junction point;
wherein the magnitude of said first control signal is greater than the magnitude of said bias voltage signal when the output voltage of said power source is less than a preselected magnitude;
wherein the magnitude of said second control signal is greater than the magnitude of said bias voltage signal when the output current of said power source is less than a predetermined magnitude; and
wherein the magnitude of said third control signal is greater than the magnitude of said bias voltage signal when the magnitude of said DC voltage is less than a second preselected magnitude.

6. A sensing and control circuit for a voltage regulator comprising:
means for producing a first status signal representative of the average output voltage of a multiple phase electric power source;
means for combining said first status signal with a reference signal to produce a first control signal;
means for producing a second status signal representative of the magnitude of the highest voltage on a plurality of output phases of said power source;
means for producing a third status signal representative of the output current of said power source;
means for combining said second status signal with said third status signal to obtain a fourth status signal;
means for combining said fourth status signal with said reference signal to produce a second control signal;
means for supplying a bias voltage signal to a junction point;
first and second diodes for coupling said first and second control signals to said junction point, thereby forming a linear output signal at said junction point;

wherein the magnitude of said first control signal is greater than the magnitude of said bias voltage signal when the output voltage of said power source is less than a preselected magnitude; and wherein the magnitude of said second control signal is greater than the magnitude of said bias voltage signal when both the output current of said power source is less than a predetermined magnitude and the voltage of the highest voltage on said output phases of said power source is less than a second preselected magnitude.

* * * * *